Figure 5:
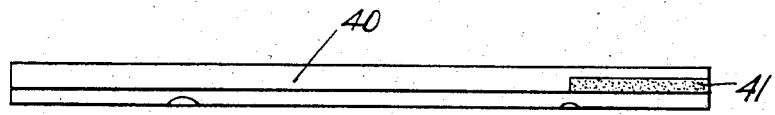

Nov. 8, 1932.  J. V. EMMONS ET AL  1,887,373
REAMER AND THE LIKE
Filed March 14, 1929   2 Sheets-Sheet 1
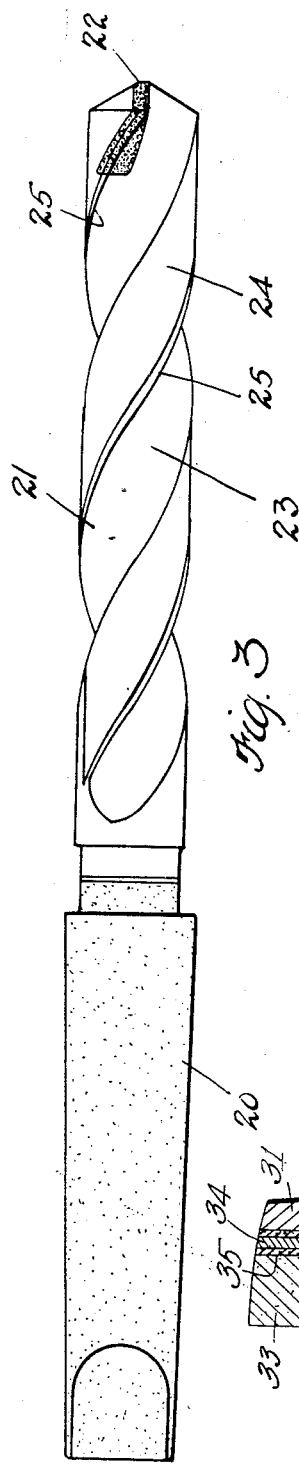
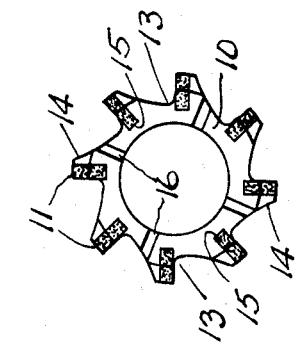
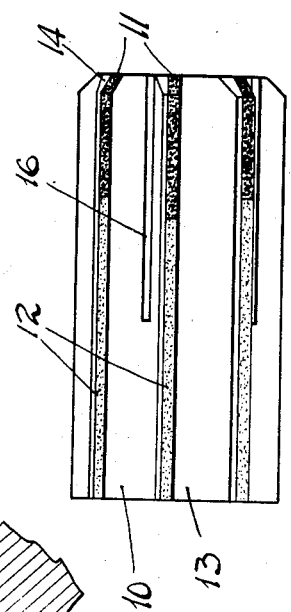
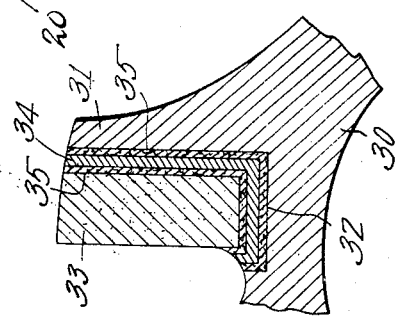
INVENTORS
Joseph V. Emmons 3rd
BY Christian Kuchenbrod.
Fay, Oberlin & Fay
ATTORNEYS.

Nov. 8, 1932.    J. V. EMMONS ET AL    1,887,373
REAMER AND THE LIKE
Filed March 14, 1929    2 Sheets-Sheet 2

INVENTORS
Joseph V. Emmons and
BY Christian Kuchenbrod
Fay, Oberlin & Fay
ATTORNEYS.

Patented Nov. 8, 1932

1,887,373

UNITED STATES PATENT OFFICE

JOSEPH V. EMMONS, OF SHAKER HEIGHTS VILLAGE, AND CHRISTIAN KUCHENBROD, OF CLEVELAND HEIGHTS, OHIO, ASSIGNORS TO THE CLEVELAND TWIST DRILL COMPANY, OF CLEVELAND, OHIO, A CORPORATION OF OHIO

REAMER AND THE LIKE

Application filed March 14, 1929. Serial No. 346,873.

The present invention relates to cutting tools, and its primary object is to provide certain improvements in the construction of such tools. In greater detail, our invention contemplates providing a tool which consists of a primary cutting means formed of one or another of the so-called hard metal alloys, secondary cutting or guiding means formed of some such material as tool or high-speed steel, and in combination with these, a supporting, holding or positioning part formed of some such material as machinery or low-carbon steel. Otherwise stated, this invention comtemplates providing a composite tool wherein the separate members are characterized by the having of those specific properties which are most essential and desirable from a functional point of view, and it further contemplates that the individual materials shall be used in such quantities and in such a manner as to not only result in a functionally balanced article but to also result in a considerable reduction in the cost of manufacture. This latter is an important feature of our invention, and the indicated reduction is due to an application of the principles of compounding above explained. When it is considered that tool or high-speed steel costs about fifteen or twenty times as much as ordinary machinery steel, it will be appreciated that in tools of the larger sizes especially, our invention will make possible a quite considerable saving, and when it is further considered that the prices of the hard metal alloys are generally of a higher order of magnitude than those of the tool and high-speed steels, the importance of our invention will become even more apparent because it is not feasible otherwise to obtain an equivalent efficiency and quality except at a correspondingly greater cost. To the accomplishment of the foregoing and related ends, said invention, then, consists of the means hereinafter fully described and particularly pointed out in the claims.

The annexed drawings and the following description set forth in detail several methods and a number of products exemplifying our invention, such disclosed procedures and products constituting, however, but some of various applications of the principles of our invention.

Figure 6:
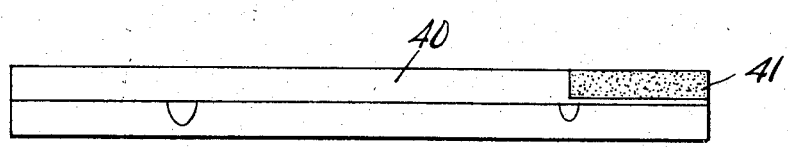
Figure 7:
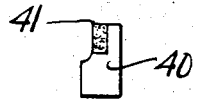
Figure 8:
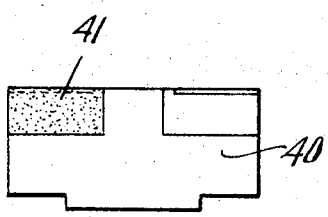
Figure 9:
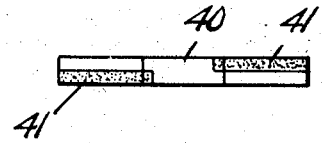
Figure 10:
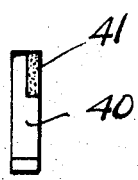

In said annexed drawings:

Figs. 1 and 2 are side and end elevational views of a reamer; Fig. 3 is a side elevational view of a twist drill; Fig. 4 is a fragmentary sectional view which shows a modfication of the reamer organization illustrated in Figs. 1 and 2; Figs. 5, 6 and 7 are plan, side and end views of a modified reamer blade; and Figs. 8, 9 and 10 are side, plan and end views of a counterbore blade.

The reamer which is here shown for purposes of illustration consists of a part 10, and the blades 11 and 12. Such part 10 is provided with the longitudinally extending flutes and lands 13 and 14, and between these features are the grooves 15. The lower or inward sides of the blades 11 and 12 are positioned within such grooves, and for making it possible to compensate for the gradual wearing of such blades, some of the flutes 13 are slotted as at 16 in order that a taper pin or some other such means may be used for radially expanding the cutting and guiding edges. The cutting blades 11 are formed of one or another of the so-called "hard metal alloys", of one containing a considerable percentage of tungsten carbide, for example, and the cutting and/or guiding blades 12 are formed of some such material as high-speed steel, high-carbon steel, alloy steel, tool steel, or of air or self-hardening steel—in other words, of an alloy or other material which is amenable to heat treatment. As the part 10 is not required to be very resistant to wear, it may be formed of some such material as machinery steel. In a completed tool, the blades 12 may be arranged for effecting a secondary cutting, or they may be arranged simply for guiding the main cutting blades 11. If desired, the meeting planes between these two sets of blades may be staggered or longitudinally off-set with relation to each other.

The twist drill shown in Fig. 3 consists of a shank 20, a working part 21, and a cutting insert or attachment 22. Such shank is welded, brazed, or otherwise joined to the working portion 21, and the latter is provided with the usual flutes and lands 23 and 24. The lands 24 are formed with the helical and relieved edges 25, and such edges, as in the case of the blades 12 (Figs. 1 and 2), may be adapted either for effecting a part of the cutting or for merely guiding the main cutter 22 and assisting the flutes in removing the cuttings or chips from a hole. The shank 20 may be formed of the same material as the part 10; the working part 21 may be formed of one or another of the materials enumerated above in connection with the description of the blades 12; and the cutter 22 may be formed of a hard metal alloy. In other words, such parts may be formed of materials which are characterized by having certain specific physical properties, and it is found that if such materials are selected, the cost of the completed article will be considerably less than would be the case if a tool of the same efficiency and quality were constructed wholly of some one or two materials having the same desired properties in addition to others which would make those particular materials more expensive, and yet not add to the efficiency of the tool.

The modified reamer shown in Fig. 4 has a body 30 which corresponds in general with the body 10, and its lands 31 are provided with the grooves 32, these latter being adapted for receiving the blades 33. Such blades may correspond either with the blades 11 or with the blades 12, and interposed between them and the body 30 are the buffer elements 34, such elements being constituted of some such tough material as iron. The purpose of these elements is to assist in absorbing the stresses which are produced when the tool is being made or used, and for securing such elements and the blades in position, any desired means may be employed, the braze or cement 35 being advantageous to this end because of its ability to also function as a buffer.

The reamer blade shown in Figs. 5, 6, and 7, and the counterbore blade shown in Figs. 8, 9 and 10 are formed of two different materials, their parts 40 being constituted of some such material as tool or high-speed steel and their parts 41 being constituted of a hard metal alloy. These parts are secured together as by brazing or welding, and the completed blades are adapted either for being permanently or removably and in cases also adjustably associated with a body of one or another of the various materials hereinafter enumerated.

In the manufacture of tools and other articles of the kind to which this invention relates, such parts as the body 10 and the blades 12 (Figs. 1 and 2), the shank 20 and the working portion 21 (Fig. 3), the body 30 and the guiding ones of the blades 33 (Fig. 4), and the parts 40 (Figs. 5 to 10 inclusive) may be formed as by casting, forging, tooling or grinding, and such parts as the cutters 11, 22, 33 (in cases), and 41 may be formed as by casting, by molding and sintering, or by grinding. The hard metal alloys of which such cutters are preferably constructed are characterized by their extreme hardness; the property most desired for the working part 21, for the blades 12 and for the blades 33 (in cases) and the parts 40 is a degree of hardness which will adapt them for functioning in a satisfactory manner in association with such cutters; and the shank 20, the part 10, and the body 30 are most desirably simply strong enough to enable the other members of the assemblage to be used in the contemplated manner. In the case of these latter parts whose only really essential characteristic is an ability to resist the working stresses, such materials as wrought iron, cast steel, malleable iron, bronze, brass, cast iron, and even certain nonmetallic substances may be employed, and it will be apparent that the selection of a material for the secondary cutting or guiding means should be made with due regard to the functions expected and the capabilities of the hard metal alloys or compounds used in the main cutting members. When these principles of compounding the various materials are followed, not only is a functionally balanced article obtained, but the cost of such an article is considerably less than it would be if the same efficiency were gotten in some other manner not involving such considerations.

The separate parts of the various articles to which this invention is applicable may be secured together or in working relation either permanently or removably in any desired manner, as for example, by welding, by soldering, by brazing, by shrinking, or by some mechanical means. If desired, the secondary cutting or guiding means of such articles may be physically improved or better adapted to particular uses by subjecting them to a heat treatment such as carburizing, nitriding, case hardening, annealing, tempering, or hardening, and such treatment may be effected either prior to, during, or subsequent to the operation by which they are secured in working relation to the other members of the assemblage. In some cases, and when particular ones of the above mentioned shank and body materials are being employed, a heat treatment may also be found advantageous—to mention only two possibilities of obtaining a sometimes desirable improvement in this direction, machinery steel may be case hardened and cast iron may be malleabilized.

By way of example, a brazing method of securing the individual parts or materials together will be described. Such parts or materials are fitted to each other; the attaching surfaces are cleaned and temporarily fitted in place; and the article is then heated to a brazing temperature. During such heating, oxidation may be prevented by maintaining a neutral or reducing atmosphere in blanketing relation to the work, or by the use of a protective covering of melted borax, or the like. When such article has reached the desired brazing temperature, the brazing metal may be applied to the joints and allowed to flow into the intervening spaces. It is not essential that the separate parts shall have been very accurately fitted to each other; on the contrary and particularly in attaching the hard metal cutters, the contiguous surfaces are preferably somewhat rough or uneven and they may even be slightly spaced from each other in order that the unions formed by the liquid braze shall have an appreciable thickness and in order that such unions shall form in effect cushioning layers which will be able to absorb the stresses due to the different coefficients of expansion of the materials being joined. We have found that an alloy consisting of about three (3) percent of aluminum and of about ninety-seven (97) percent of copper makes a satisfactory brazing material, and that a joint formed of this material is elastic and tough enough to obviate any tendency towards separation of the connected parts, but it will be apparent that the composition and properties of the metal used in the bonds between the several parts can be varied in any manner made necessary by the character of the parts, by the nature of the service for which the particular article is intended, or by the nature of the heat treatments to which some of such parts either have been or are to be subjected.

As above stated, any heat treatment of the non-wearing or cutting and/or guiding parts of the articles embodying our present improvements may be effected either prior to the uniting of such parts with the other or others, during the time when such parts are being joined, or after some two or more of the separate members have been joined. These treatments may be directed to the improvements of some one or more properties of the materials under consideration. For example, the secondary cutters or guides may be toughened or hardened or adapted for better resisting abrasion, and the non-wearing parts may be similarly improved in one or more respects, as may also the cementing or buffing material. The particular treatments to which some of the parts are subjected will, of course, depend upon the service for which the completed article is intended, and it will be understood that in this field a great number of possible treatments and combinations of treatments are available, and that these can be effected at a number of points in the processes by which the articles are produced.

It will be obvious that the principles of this invention are applicable to many tools and articles other than those herein illustrated and described, and that even in particular cases the invention may be differently embodied. Similarly, it will be understood that the selection of particular materials from the various classes of materials can be made with due regard to the intended use of the completed article, and that the other variable factors such as the method employed for securing the parts together and the relative proportions of the different members can be adapted to the particular article under consideration.

Other forms may be employed embodying the features of our invention instead of the one here explained, change being made in the form or construction, provided the elements stated by any of the following claims or the equivalent of such stated elements be employed, whether produced by our preferred method or by others embodying steps equivalent to those stated in the following claims.

We therefore particularly point out and distinctly claim as our invention:

1. As an article of manufacture, a rotatable tool having a body of rigid, hardened steel and a blade of rigid, hard non-ferrous metal, the coefficients of thermal expansion of which are materially different, and means for securing the blade to the body to permit relative movement resulting from differences in thermal expansion without rupture, said securing means including a metallic layer of yielding material to which the body and blade are atomically united.

2. As an article of manufacture, a rotatable tool having a body of rigid, hardened steel and a blade of rigid, hard non-ferrous metal, the coefficients of thermal expansion of which are materially different, and means for securing the blade to the body to permit relative movement resulting from differences in thermal expansion without rupture, said securing means including a layer of iron to which said body and blade are brazed.

3. In a reamer, a substantially cylindrical body having flutes and lands and cutting blades of metallic carbide composition secured to the forward faces of said lands, said blades and body having materially different coefficients of thermal expansion, and said blades secured to said lands by means including a layer of iron to which said body and blades are brazed.

4. As an article of manufacture, a rotatable tool having a plurality of composite blades having composite cutting edges in which the principal cutting action is performed by a plurality of components of a hard non-ferrous material and the secondary cutting action is performed by a plurality of components of hard steel, said primary and secondary cutting edges being contiguous, with the junctions so staggered in alignment that they do not directly follow each other in operation.

Signed by us this 12 day of March, 1929.

JOSEPH V. EMMONS.
CHRISTIAN KUCHENBROD.